United States Patent
Dalsgaard et al.

(10) Patent No.: US 10,567,989 B2
(45) Date of Patent: Feb. 18, 2020

(54) COORDINATED MULTIPOINT NETWORK MEASUREMENT SET MANAGEMENT

(75) Inventors: Lars Dalsgaard, Oulu (FI); Klaus Hugl, Vienna (AT)

(73) Assignee: Nokia Technologies Oy, Espoo (FI)

( * ) Notice: Subject to any disclaimer, the term of this patent is extended or adjusted under 35 U.S.C. 154(b) by 538 days.

(21) Appl. No.: 14/413,633

(22) PCT Filed: Aug. 8, 2012

(86) PCT No.: PCT/IB2012/054053
§ 371 (c)(1),
(2), (4) Date: Jan. 27, 2015

(87) PCT Pub. No.: WO2014/024003
PCT Pub. Date: Feb. 13, 2014

(65) Prior Publication Data
US 2015/0208265 A1  Jul. 23, 2015

(51) Int. Cl.
*H04W 52/24*   (2009.01)
*H04W 72/08*   (2009.01)
(Continued)

(52) U.S. Cl.
CPC .......... *H04W 24/10* (2013.01); *H04L 5/0035* (2013.01); *H04L 5/0048* (2013.01);
(Continued)

(58) Field of Classification Search
CPC ..... H04B 17/382; H04B 7/024; H04L 5/0035; H04L 5/0048; H04L 5/0053; H04W 24/10;
(Continued)

(56) References Cited

U.S. PATENT DOCUMENTS 9,154,194 B2 * 10/2015 Koivisto ................ H04B 7/024
9,213,080 B2 * 12/2015 Siomina ................ G01S 5/0226
(Continued)

FOREIGN PATENT DOCUMENTS

KR  20100110526 A  10/2010
WO  2011014834 A2   2/2010
(Continued)

OTHER PUBLICATIONS

R2-122135; 3GPP TSG-RAN WG2 Meeting #78; General framework and principles for configuration of CSI-RS based received signal quality measurement; Prague, Czech Republic, May 21-25, 2012.*

(Continued)

*Primary Examiner* — Raj Jain
(74) *Attorney, Agent, or Firm* — Harrington & Smith (57) ABSTRACT

The exemplary embodiments of the invention relate to at least a method and apparatus to perform determining, at a user device, an initial signal power of a cell specific reference signal and a signal power for each reference signal of at least one reference signal in a network; identifying a change as compared to at least one of the initial signal power of the cell specific reference signal and the at least one reference signal; and based on the identifying, triggering another determining of a signal power of reference signals of the at least one reference signal in the network. Further, the exemplary embodiments relate to at least a method and apparatus to perform configuring, at a network device, at least one reference signal, sending, towards a user equipment of a network, information including an indication of the at least one reference signal, sending, towards the user equipment a request to perform signal power or signal quality measurements of the indicated at least one reference signal; and sending, towards the user equipment of a net- (Continued)

work, a threshold to be used by the user equipment of the network in the measurement procedure of signal power or signal quality of the indicated at least on reference signal.

20 Claims, 6 Drawing Sheets

(51) Int. Cl.
*H04W 72/12* (2009.01)
*H04W 24/10* (2009.01)
*H04L 5/00* (2006.01)

(52) U.S. Cl.
CPC ......... *H04W 52/241* (2013.01); *H04W 72/08* (2013.01); *H04W 72/12* (2013.01)

(58) Field of Classification Search
CPC ... H04W 52/241; H04W 72/08; H04W 72/12; H04W 52/146; H04W 72/082; H04W 36/0055; H04W 36/0083; H04W 52/325
USPC .......................................................... 370/252
See application file for complete search history.

(56) References Cited

U.S. PATENT DOCUMENTS

| | | | |
|---|---|---|---|
| 2010/0106828 A1* | 4/2010 | Palanki ................. | H04L 1/02 709/224 |
| 2010/0254471 A1* | 10/2010 | Ko ........................ | H04L 5/0023 375/260 |
| 2011/0170496 A1* | 7/2011 | Fong .................... | H04L 5/0053 370/329 |
| 2011/0255436 A1* | 10/2011 | Jian ....................... | H04B 7/024 370/252 |
| 2011/0269449 A1* | 11/2011 | Kazmi ................... | H04B 7/024 455/422.1 |
| 2011/0274047 A1* | 11/2011 | Kwon ................... | H04W 52/40 370/328 |
| 2012/0082047 A1* | 4/2012 | Wu ....................... | H04W 72/082 370/252 |
| 2012/0122472 A1* | 5/2012 | Krishnamurthy ..... | H04L 5/0053 455/456.1 |
| 2012/0188877 A1* | 7/2012 | Chin ..................... | H04W 24/10 370/241 |
| 2012/0213109 A1* | 8/2012 | Xu ........................ | H04B 7/024 370/252 |
| 2012/0250558 A1* | 10/2012 | Chung .................. | H04L 1/0026 370/252 |
| 2012/0329503 A1* | 12/2012 | Jongren ................ | H04W 52/10 455/509 |
| 2013/0021925 A1* | 1/2013 | Yin ....................... | H04B 7/024 370/252 |
| 2013/0029657 A1* | 1/2013 | Gao ..................... | H04W 74/004 455/422.1 |
| 2013/0286866 A1* | 10/2013 | Hammarwall ......... | H04B 7/024 370/252 |
| 2013/0344869 A1* | 12/2013 | Yamada ............... | H04W 36/0094 455/436 |
| 2014/0086221 A1* | 3/2014 | Davydov ............... | H04W 4/06 370/336 |
| 2014/0133425 A1* | 5/2014 | Kim ...................... | H04B 7/024 370/329 |
| 2015/0208265 A1* | 7/2015 | Dalsgaard ............ | H04B 17/382 370/252 |

FOREIGN PATENT DOCUMENTS

| | | |
|---|---|---|
| WO | 2010048437 A2 | 4/2010 |
| WO | 2010101431 A2 | 9/2010 |
| WO | 2010107260 A2 | 9/2010 |
| WO | 2012/061770 A3 | 5/2012 |

OTHER PUBLICATIONS

R1-122841; 3GPP TSG-RAN WG1 #69; Title: Definition of Measurements for CoMP Resource Management Prague, Czech Republic, 21st-301 h May 2012.*
R1-120173;3GPP TSG RAN WG1 #68;Title: Discussions on measurements based on CSI-RS; Dresden, Germany, Feb. 6-10, 2012.*
R1-120244; 3GPP TSG-RAN WG1 #68; Title:Discussion on RRM/ CoMP Measurement Set Management Dresden,Germany, Feb. 6-10, 2012.*
R1-093949; 3GPP TSG-RAN WG1 #58b; Title:CoMP feedback overhead reduction based on precoded RS; Miyazaki, Japan, Oct. 12-16, 2009.*
International Search Report and Written Opinion received for corresponding Patent Cooperation Treaty Application No. PCT/IB2012/054053, dated Aug. 15, 2013, 9 pages.
"3rd Generation Partnership Project; Technical Specification Group Radio Access Network; Coordinated multi-point operation for LTE physical layer aspects (Release 11)", 3GPP TR 36.819, V11.1.0, Dec. 2011, pp. 1-69.
Partial Supplementary European Search Report received for corresponding European Patent Application No. 12882867.0, dated Feb. 17, 2016, 8 pages.
"Discussion on RRM/CoMP Measurement Set Management", 3GPP TSG-RAN WG1 #68, R1-120244, Agenda: 7.5.3, Hitachi Ltd., Feb. 6-10, 2012, pp. 1-4.
"General Framework and Principles for Configuration of CSI-RS Based Received Signal Quality Measurement", 3GPP TSG-RAN WG2 Meeting #78, R2-122135, Agenda: 7.8, Huawei, May 21-25, 2012, pp. 1-5.
"Discussions on Measurements Based on CSI-RS", 3GPP TSG RAN WG1 #68, R1-120173, Agenda: 7.5.3, Samsung, Feb. 6-10, 2012, pp. 1-4.
"Discussion on CoMP Measurement Set and RRM Measurement Set", 3GPP TSG RAN WG1 Meeting #68, R1-120303, Agenda: 7.5.3, ZTE, Feb. 6-10, 2012, pp. 1-3.
Office action received for corresponding Korean Patent Application No. 2015-7005991, dated May 20, 2016, 7 pages of office action and no pages of office action translation available.
"Further Details on CSI-RS Based Measurement for CompResource Management Set", 3GPP TSG-RAN WG1 #69, R1-122161, Agenda Item: 7.5.3, MediaTek Inc., May 21-25, 2012, 4 pages.
"Definition of Measurements for CoMP Resource Management", 3GPP TSG-RAN WG1 #69, R1-122841, Agenda Item: 7.5.3, Ericsson, May 21-30, 2012, 4 pages.
"LS on CSI-RSRP and CoMP Resource Management Set", 3GPP TSG-RAN1 Meeting #69, R1-123077, TSG-RAN WG1, COMP_LTE_DL-Core, May 21-25, 2012, 2 pages.
Extended European European Search Report received for corresponding European Patent Application No. 12882867.0, dated Jun. 2, 2016, 14 pages.

\* cited by examiner

COORDINATED MULTIPOINT NETWORK MEASUREMENT SET MANAGEMENT

RELATED APPLICATION

This application was originally filed as Patent Cooperation Treaty Application No. PCT/IB2012/054053 filed Aug. 8, 2012.

The teachings in accordance with the exemplary embodiments of this invention relate generally to reducing unnecessary measurements by a user device in a coordinated multipoint (CoMP) network and, more specifically, relate to monitoring a cell specific reference signal and performing a subsequent measurement of a determined CoMP Resource Management Set only when there is a change in the cell specific reference signal.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
ACK acknowledgement
BS base station
COMP coordinated multipoint network operation
CQI channel quality indicator
CRS cell specific reference signal
CRS RSRP cell specific reference signal (CRS) reference signal received power (RSRP)
CSI channel state information
CSI-RS channel state information reference signal
CSI-RS RSRP channel state information reference signal (CSI-RS) reference signal received power (RSRP)
DCI downlink control information
DL downlink
ID identification
eNodeB base station
LPN low power nodes
PBCH physical broadcast channel
PCI Physical Cell Identifier
PDSCH physical downlink shared channel
PDCCH physical downlink control channel
PMI precoding matrix indicator
PSS primary synchronization channel
RI rank indicator
RRH remote radio head
RSRP reference signal received power
RSRQ reference signal received quality
SRS sounding reference signal
SSS secondary synchronization signal
TP transmission point
UE user equipment
UL uplink
VLR visitor location register
VNO visitor location register Coordinated multipoint (COMP) transmission and reception is one of the technologies investigated in 3GPP LTE-A to enhance specifically the cell-edge data rates in order to create a more uniform data rate experience for the end-user over the entire cell area. These COMP techniques require increased collaboration between different BS nodes (eNodeBs) such as in DL transmission to the UE and UL reception from the UE.

CoMP scenarios for different deployment scenarios are specified in 3GPP Rel. 11. One such CoMP scenario focused on a heterogeneous network which involves the collaboration and/or cooperation within a heterogeneous network, i.e. one or more small cells are placed within the coverage of an eNodeBs. In this CoMP heterogeneous network deployment scenario, denoted as CoMP Scenario 4 in 3GPP, several transmission points (TPs) share the same physical cell-ID. These TPs can include a high-power (macro) transmission point and underlying low-power pico or radio remote heads (RRH) within the coverage area of the high-power transmission point.

Figure 1:
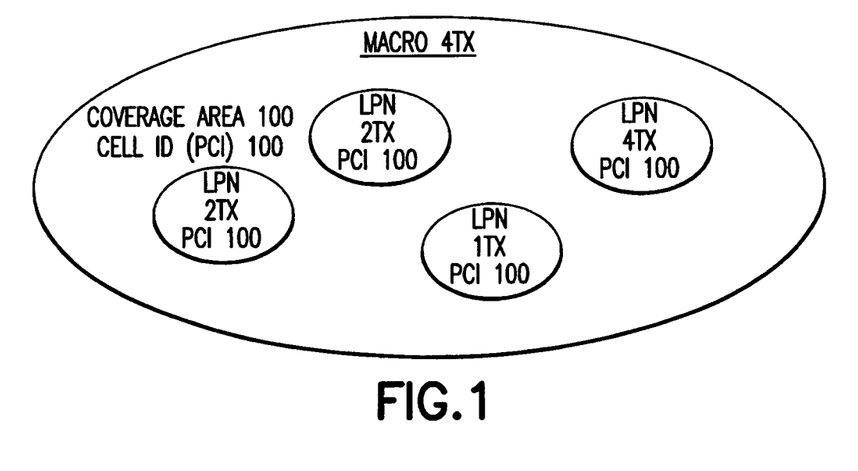
FIG. 1 shows a 3GPP intra-cell CoMP Network Scenario.

In regards to FIG. 1, there is illustrated a 3GPP intra-cell CoMP network scenario. As shown in FIG. 1, there is one macro eNodeB in a coverage area 100 with physical cell identification (PCI) of 100. In this example the macro eNodeB has four TX antennas. Also shown in the coverage area 100 of FIG. 1 are 4 low power network (LPN) devices, such as using eNodeBs or other types of nodes. In FIG. 1 the four LPNs represent four micro-cell type hotspots each have one or more transmit (TX) antennas associated with the macro eNodeB, as well as a respective number of CSI-RS ports configured.

In addition to the macro eNodeB and the underlying LPNs sharing the same physical cell-ID (PCI), they also share the same primary synchronization channel (PSS) and secondary synchronization channel (SSS) as well as a cell specific reference signal (CRS). Consequently they each use all the channels, such as a physical broadcast channel (PBCH) and a physical downlink control channel (PDCCH), which detection and demodulation depends on for the CRS. One might think of only transmitting these channels through the macro eNodeB as the LPNs are supposed to be in the coverage area of the macro, but this would not be a sustainable solution. This is for at least the reason that inter-cell mobility procedures using CRS based mobility measurements, such as CRS reference signal received signal power (RSRP) measurements and/or reference signal received quality (RSRQ) measurements may not be correct. Take for example, a situation where a LPN is close to the cell-border to the neighboring cell having different cell-ID. In this case if the LPN is not transmitting e.g., a CRS signal (common to the serving macro eNodeB) the measured RSRP on the UE side would be based only on the CRS signals from the macro eNodeBs (serving and/or neighbor cells) and would not be able to get full benefit from the improved conditions due to adding the LPN. In general all the TX nodes sharing the same cell-ID are transmitting the same common signals.

SUMMARY

In an exemplary aspect of the invention, there is a method comprising determining, at a user device, an initial signal power of a cell specific reference signal and a signal power for each reference signal of at least one reference signal in a network; identifying a change as compared to at least one of the initial signal power of the cell specific reference signal and the at least one reference signal; and based on the identifying, triggering another determining of a signal power of each reference signal of the at least one reference signal in the network.

In an exemplary aspect of the invention, there is an apparatus comprising at least one processor; and at least one memory including computer program code, where the at least one memory and the computer program code are configured, with the at least one processor, to cause the apparatus to at least: determine an initial signal power of a cell specific reference signal and a signal power for each reference signal of at least one reference signal in a network; identify a change as compared to at least one of the initial signal power of the cell specific reference signal and the at least one reference signal; and based on the identifying, triggering another determining of a signal power of each reference signal of the at least one reference signal in the network In another exemplary aspect of the invention, there is an apparatus comprising a means for determining, at a user device, an initial signal power of a cell specific reference signal and a signal power for each reference signal of at least one reference signal in a network; means for identifying a change as compared to at least one of the initial signal power of the cell specific reference signal and the at least one reference signal; and means, based on the identifying, for triggering another determining of a signal power of each reference signal of the at least one reference signals in the network.

The apparatus according to the paragraph above where the means for determining, identifying, and again determining comprises a computer readable memory embodying computer program code, the computer program code executed by at least one processor.

In another exemplary aspect of the invention, there is a method comprising: configuring, at a network device, at least one reference signal; and sending, towards a user equipment of a network, information comprising an indication of the at least one reference signal, sending, towards the user equipment, a request to perform signal power or signal quality measurements of the indicated at least one reference signal; and sending, towards the user equipment, a threshold to be used by the user equipment of the network in the measurement procedure of signal power or signal quality of the indicated at least on reference signal.

In another exemplary aspect of the invention, there is an apparatus comprising: at least one processor; and at least one memory including computer program code, where the at least one memory and the computer program code are configured, with the at least one processor, to cause the apparatus to at least: configure at least one reference signal; send, towards a user equipment of a network, information comprising an indication of the at least one reference signal, send, towards the user equipment, a request to perform signal power or signal quality measurements of the indicated at least one reference signal; and send, towards the user equipment, a threshold to be used by the user equipment in the measurement procedure of signal power or signal quality of the indicated at least on reference signal.

In still another exemplary aspect of the invention, there is an apparatus comprising: means for configuring at least one reference signal; means for sending, towards a user equipment of a network, information comprising an indication of the at least one reference signal, means for sending, towards the user equipment, a request to perform signal power or signal quality measurements of the indicated at least one reference signal; and means for sending, towards the user equipment, a threshold to be used by the user equipment in the measurement procedure of signal power or signal quality of the indicated at least on reference signal.

The apparatus according to the paragraph above, where the means for configuring comprises a computer readable memory embodying computer program code, the computer program code executed by at least one processor, and where the means for sending comprises an interface to a network.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

The exemplary embodiments of the invention relate to monitoring in a CoMP network a cell specific reference signal and performing a subsequent measurement of a determined CoMP Resource Management Set only when there is a change in the cell specific reference signal.

From a 3GPP Rel.8-10 procedure point of view, the UE is only able to distinguish transmission points based on measurements from different cell-IDs, i.e. neighbor cell search & measurements using cell-ID specific PSS/SSS/CRS etc. In order to enable intra-cell CoMP, the network will use different CSI-RS resources (i.e., different CSI-RS configurations) for different LPN's and also inform the UE about the used CSI-RS resources within the coverage of a cell (including macro and LPN's). The LPN specific CSI-RS for each of the transmission points is used by the UE to perform specific channel state information (CSI) measurements for the different transmission points. Using LPN specific CSI-RS the UE is able to perform LPN specific measurements, and the different CSI-RS resources are such this is the only possibility for the UE to distinguish the different transmission points from each other. This of course leads to the requirement that the network first give the UE the information about the used CSI-RS resources in the LPNs as well as the macro cell.

As envisioned by 3GPP Rel. 11 DL Comp operation:
1. The network transmits different CSI-RS resources from the different transmission points sharing the same cell-ID. Different CSI-RS resources require a different CSI-RS configuration at least in terms of resource elements and/or sequence usage. In the example of FIG. 1, there are 5 different CSI-RS resources including one for the macro and four for the LPN are expected to be present.
2. The network selects a subset of the available transmission points as the "CoMP measurement set."
3. The "CoMP Measurement Set" is used to inform the UE regarding higher layer signaling, related to the CSI-RS resources, on which the UE should perform CSI measurements, evaluation, and reporting.

4. The UE feeds back CSI information to the network regarding the CSI-RS resources identified in the UE specific "CoMP Measurement Set".
5. Based on the CSI feedback, the network adopts its CoMP transmission strategy and makes scheduling decisions including a selection of a CoMP transmission mode. Such a transmission mode may include a coherent joint transmission from several chosen TPs or from a single chosen TP.
6. Based on scheduling information (DCI), the UE decodes the PDSCH accordingly.

Now let us have a closer look on how the network will do the CoMP Measurement Set management, which is the down selection process from all the available TPs to a limited number of useful TPs.

CoMP Measurement Set Management:

A reason and/or need for this step is that the network, such as the CoMP network of FIG. 1, could request CSI measurements from all the TPs. However, this would mean that the UE would need to measure at least 5 different CSIs (including RI, PMI, and/or CQI) and report these measurements back to the network. This measuring can create a potentially large burden on the UE. In addition, this approach could also lead to additional UL signaling overhead required to feedback the CSI to the network. However, it makes no sense to feedback CSI related to LPNs which are seen as very weak, such that the measurement is irrelevant. Therefore, the common assumption by 3GPP currently is that the CoMP Measurement Set should have a size of 2-3 resources. This meaning that not more than 2-3 CSI-RS resources or TPs should configured for the UE to perform CSI measurements and reporting. However, presently the signaling, though potentially burdensome, is still required as the network needs to know which transmission points should be included and/or excluded for the UE specific CoMP Measurement Set.

Now we will distinguish between inter-cell CoMP (3GPP CoMP Scenarios 1-3) and intra-cell CoMP.

Inter-Cell CoMP

For inter-cell CoMP each of the transmission points has a distinct and separate cell ID. TPs of an inter-cell CoMP are distinguishable, at least from the UEs point of view, as they each have a different CRS. Therefore, according to 3GPP Rel. 8-10, measurements such as RSRP/RSRQ based on CRS are readily available. In such a scenario the network can select the 2-3 cells with the best metric based on the feedback from the UE to determine the CoMP measurement set. Such feedback can include measurements of RSRP and/or RSRQ for example. So for inter-cell CoMP such legacy measurements can be used for the CoMP Measurement Set management.

Intra-Cell CoMP

In contrast to inter-cell CoMP network operations, intra-cell CoMP network operations do not afford the same capability for the UE or the network to distinguish between the different transmission points such as by using legacy measurements as in the inter-cell CoMP. Instead, intra-cell CoMP network operations have to rely on CSI-RS measurements. The transmission and/or configuration of CSI-RS resources for these measurements is fully up to the network. Further, the UE is not aware whether one or several TPs are even available within a range of the UE. In part this is due to the TPs sharing the same cell-ID. Thus, there is a need for optimizing at least the UE measurement operations in an intra-cell CoMP network. Two options have now been considered in 3GPP to enable intra-cell CoMP Measurement Set management. The CoMP Measurement Set management can be based on:

UL measurements: Sounding (based on SRS) or based on UL transmissions from the UE (e.g. PUSCH/PUCCH transmissions), the network measures the signal strength/quality from the different TP. Based on this information (which basically corresponds to relative path-loss) and the known transmit powers of the individual TPs, the network is selecting the best expected serving DL TPs; and CSI-RS signal quality measurements: Alternatively, it has been proposed, as tentatively agreed on in 3GPP RAN1 meeting in the February 2012, to specify an additional signal quality measurement based on CSI-RS. This additional measurement is intended to help in an intra-cell CoMP environment to get UE measurement assistance for the needed CoMP Measurement Set management.

As an example, in such an intra-cell CoMP operation the network requests, from a UE, RSRP/RSRQ measurements from the set of CSI-RS resources of the TPs in order to be able to perform a subset selection for a CoMP measurement set. According to the latest agreements in 3GPP, which are referred to in the next paragraph, the set of CSI-RS resources for which the RSRP/RSRQ measurements should be performed by the UE is denoted with "CoMP Resource Management Set", as defined in RAN1 #68bis. In contrast, the CSI-RS resources for which the UE should perform CSI measurements are denoted as the "CoMP Measurement Set," as defined in RAN1#68bis. Thus, rather than requesting full CSI measurements from all the TPs/CSI-RS resources the selection of the best serving TPs as part of the CoMP Measurement set definition results in less overhead than if measurements from all the TPs in the CoMP network are requested. In contrast to requesting full CSI measurements from all the TPs/CSI-RS resources, the CSI-RS resource signal quality measurements of the CoMP Resource Management Set are simpler and might not be needed as frequently as normal CSI measurements. This helps to restrict full CSI measurements to the TPs/CSI-RS resource really required to the (i.e., 2-3) best serving points in the CoMP Measurement Set and reduces measurement complexity and reporting overhead. It is noted that the terms management set and measurement set may be interchangeable.

The working assumption on CSI-RS RSRP measurement from the RAN1#68bis meeting has been written as:

Introduce CSI-RS based received signal quality measurement (e.g. RSRP) and reporting, at least for the following purpose:
   CoMP Measurement Set management for CSI feedback (according to the definition in TR36.819).
   This functionality is configurable by network
   Note that this proposal does not have any impact on inter-cell mobility handling
   For the purpose of the CSI-RS based received signal quality measurement, the UE may assume the timing of the received CSI-RSs is the same as that derived from the PSS/SSS of the serving cell
   Note that this does not imply anything about the assumed timing for other measurements Further, the following naming has been defined at the same meeting as an outcome of the RAN1#68bis meeting on the set of CSI-RS resources for which RSRP/RSRQ or similar signal measurements should be performed:

CoMP Resource Management Set: The set of CSI-RS resources for which CSI-RS based received signal measurements can be made and reported.

These received signal measurements can be used to configure the CoMP Measurement Set.

Note that other measurements, such as mobility measurements or SRS, can also be used to configure the CoMP Resource Management Set.

Note that this is independent of existing mobility measurements and procedures

Still, it is currently undefined how often the CSI-RS based received signal measurements (e.g. RSRP/RSRQ or similar) for the CoMP Resource Management Set from the UE side need to be done. Whether such measurements are to be performed continuously after they have been requested by the network or how frequently the UE must perform the measurement procedures.

Known ways of conducting such measurements include:

Periodic measurements: The network configures a certain periodicity, in which the UE should monitor the signal quality of the CSI-RS resources in the CoMP Resource Management Set. This leads to the case, that also a stationary UE performs regular measurements—which leads to unnecessary computational burden and UE power consumption.

Network triggered measurements: the network triggers the time of the measurement of the CoMP Resource Management Set based on signaling. For this, the network would need to know if the situation as such has been changing—which of course the network as such is not aware of. In addition, the measurement trigger needs to be signaled creating additional DL signaling overhead.

In contrast, the exemplary embodiments of the invention provide novel method of a UE triggered signal strength/quality measurement of the CoMP Resource Management Set, configured for the UE, in response to a change in a cell specific reference signal.

In accordance with the exemplary embodiments of the invention, a new CSI-RS signal quality measurement of the CoMP Resource Management Set should preferably only be performed when the received signal situation at the UE is changing. This could be for example when the UE is getting within or leaving a coverage area of an LPN or is moving in general. Further, the exemplary embodiments of the invention provide a benefit even if the UE has been moving within the LPN cell coverage area and is just getting close to the LPN. The invention provides for the UE to use a cell specific reference signal received signal measurement as CRS RSRP to trigger the UE measurements of CSI-RS signal quality (RSRP/RSRQ) of the CoMP Resource Management Set for CoMP usage. As continuous or repeated/periodic measurements of CRS RSRP are already required for intra-cell mobility support (since 3GPP Rel. 8) using the CRS RSRP to trigger a CSI-RS measurement of TPs of a CoMP Resource Management Set is clearly advantageous at least to reduce measurement overhead for the UE.

Figure 2:
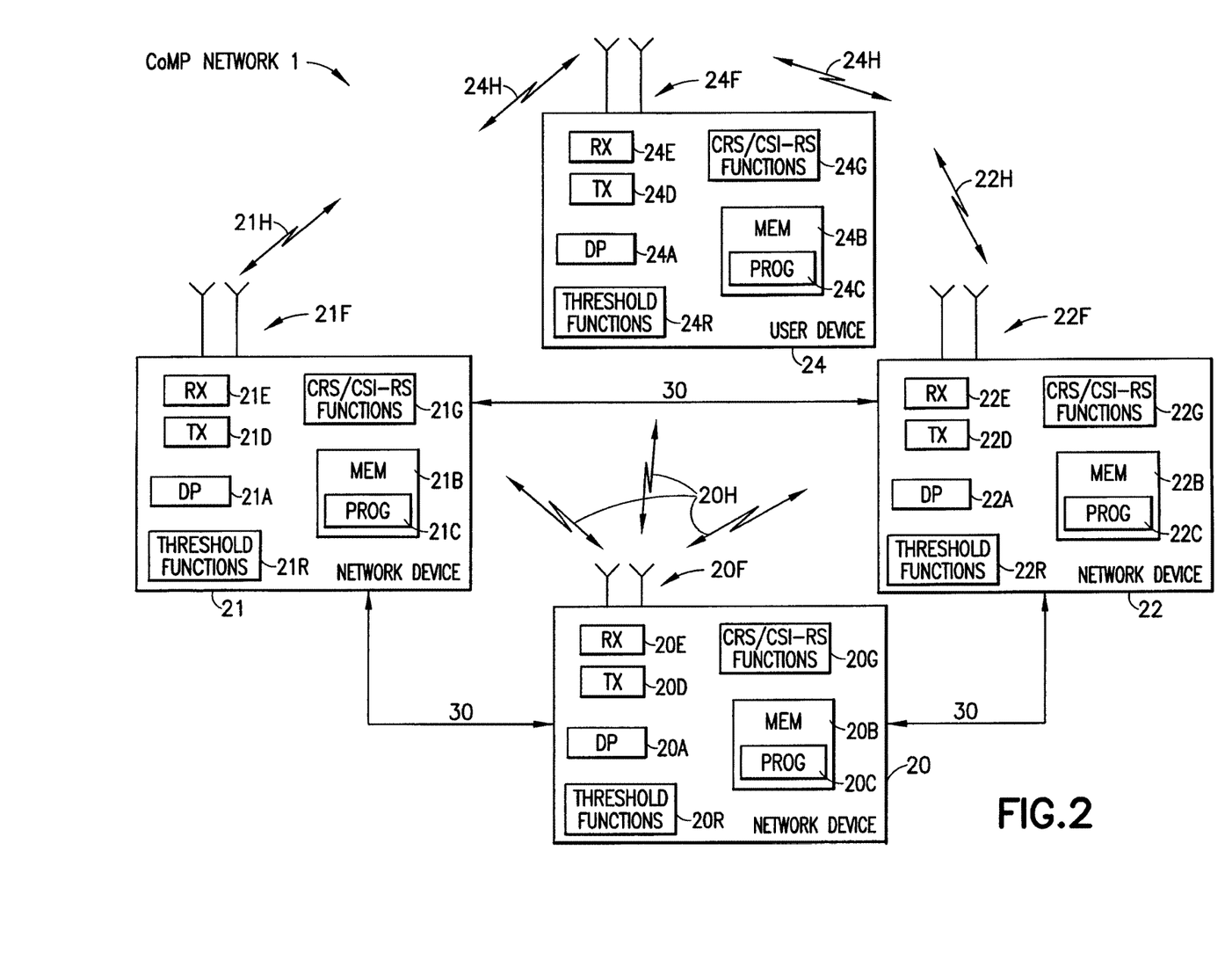
FIG. 2 shows a simplified block diagram of exemplary electronic devices that are suitable for use in practicing various exemplary embodiments of this invention.

A reference is now made to FIG. 2 for illustrating a simplified block diagram of various electronic devices and apparatus that are suitable for use in practicing the exemplary embodiments of this invention. FIG. 2 illustrates a CoMP network 1, which may include different wireless communication type(s) or combination(s), any of which could benefit from the invention. In FIG. 2 network devices 20, 21 and 22, or other network nodes, are adapted for communication over a wireless link (not specifically shown) with mobile apparatuses, such as mobile terminals, UEs or user devices 24. The network devices 20, 21 and 22 are configured to operate using at least measurements and signaling in a CoMP network, in accordance with the exemplary embodiments of the invention as described below. The UEs or user devices 24 can be any device in the wireless network 1 enabled to operate in accordance with the exemplary embodiments of the invention as described above. It is noted that the user devices 24 as described herein may be referred to in a non-limiting manner as subscriber stations. The network devices 20, 21 and 22 may be embodied in a network node of a communication network, such as embodied in a base station of a cellular network or another device of the cellular network. Similarly, the network devices 20, 21 and 22 can be configured to perform internet protocol communications and/or routing function. In one particular implementation, any of the network devices 20, 21 and 22 may be embodied as a base station, eNodeB, eNB, or another network device associated with a CoMP network, such as the Comp network 1 of FIG. 2. Further, the network devices 20, 21, and/or 22 described herein may be referred to in a non-limiting manner as transmission points (TPs), low power nodes (LPNs). High power nodes (HPNs), eNodeBs, and/or eNBs.

The network device 20 includes processing means such as at least one data processor (DP) 20A, storing means such as at least one computer-readable memory (MEM) 20B storing at least one computer program (PROG) 20C, and may also comprise communicating means such as a transmitter TX 20D and a receiver RX 20E for bidirectional wireless communications with the user device 24 via one or more antennas 20F. The RX 20E and the TX 20D are each shown as being embodied with a one or more antenna 20H in a radio-frequency front end chip, which is one non-limiting embodiment; the at least one antenna 20H may be a physically separate but electrically coupled component. Further, the network device 20 incorporates a CRS/CSI-RS function 20G which is coupled to at least the DP 20A, the MEM 20B and the PROG 20C of the network device 20. The CRS/CSI-RS functions 20G to be used to perform operations of at least of performing CRS and/or CSI-RS measurements.

The network device 21 similarly includes processing means such as at least one data processor (DP) 21A, storing means such as at least one computer-readable memory (MEM) 21B storing at least one computer program (PROG) 21C, and may also comprise communicating means such as a transmitter TX 21D and a receiver RX 21E for bidirectional wireless and/or wired communications, such as CoMP network communications, with other apparatus of FIG. 2 via one or more antennas 21H. Using the CRS/CSI-RS function 21G, the network device 21 is at least enabled to perform the exemplary operations including at least processing the waveforms signaling communicated via the antennas 21H and performing the operations as in accordance with the exemplary embodiments of the invention, as described above, such as from any of the other devices as illustrated in FIG. 2.

Similarly, the network device 22 includes processing means such as at least one data processor (DP) 22A, storing means such as at least one computer-readable memory (MEM) 22 storing at least one computer program (PROG) 22C for processing of bidirectional signaling such as signaling received or transmitted via the capable antennas 22H, in accordance with the exemplary embodiments. Similar to the user device 21 the network device 22 is at least enabled, using the CRS/CSI-RS functions 22G, to perform the operations including at least interfacing with the antennas 22H to perform operations of at least CRS and/or CSI-RS measurements, in accordance with the exemplary embodiments of the invention.

The user device 24 includes its own processing means such as at least one data processor (DP) 24A, storing means such as at least one computer-readable memory (MEM) 24B storing at least one computer program (PROG) 24C, and may also comprise communicating means such as a transmitter TX 24D and a receiver RX 24E and at least one antenna 24H for bidirectional wireless communications with devices 20, 21, 22 and 24 as detailed above via its antennas 24H. Thus, similar to the user devices 21 and 22 the user device 24 is at least enabled, using the CRS/CSI-RS functions 24G, to perform the operations including measuring CRS and/or CSI-RS signal strengths in accordance with the exemplary embodiments of the invention. Further, the CRS/CSI-RS functions 24G is operable to communicate with the threshold functions 24R in order to at least determine whether a change in CRS signal strength is sufficient to cause other measuring operations in accordance with the exemplary embodiments. Also the threshold functions 24R are operable to determine a threshold and/or receive a threshold setting from a network device, such as the network device 20, 21, and/or 22. In addition, while the network devices 20, 21, and 22, and user devices 24 are discussed with respect to the network devices 20, 21, and 22 acting as a centralized node, the disclosure included herein may also apply to mesh networks.

The network devices 20, 21, and/or 22 are considered to be part of CoMP network 1, which might be a heterogeneous network as illustrated in FIG. 1. Further, any reference to low power nodes is not limiting and the network devices can include low power nodes and/or high power nodes. Further, the network devices 20, 21, and/or 22 of the cluster are overlapping coverage of an area of the wireless network 1 where the user device 24 is located. In addition, illustrated lines 30 between the network devices 20, 21, and 22 represent backhaul links. The backhaul links 30 may be wired and/or wireless and/or may comprise fiber technology. The backhaul links 30 are used at least to allow communication between the network devices of the CoMP network 1 in accordance with the exemplary embodiments of the invention.

In addition, as illustrated in FIG. 2 the network devices 20, 21, and 22 include a threshold function 20R, 21R, and 22R, respectively. These threshold functions are configured to perform at least operations of determining a threshold and sending the threshold to the user device 24, as in accordance with the exemplary embodiments. Further, any of the CRS/CSI-RS functions and/or the threshold functions may be performed by another device in the CoMP network 1. As similarly stated above, although the embodiments of the invention may be described with regards to a CoMP network, this is non-limiting and the invention can be used to benefit any wireless and/or wired communication type network. In addition, although three network devices and one user device are illustrated in FIG. 2, this is non-limiting and the invention may be practiced using less or more network devices and/or user devices.

At least one of the PROGs 20C, 21C, 22C and 24C configured in the devices 20, 21, 22 and 24 are assumed to include program instructions that, when executed by the associated DP 20A, 21A, 22A and 24A enable the respective device to operate in accordance with the exemplary embodiments of this invention, as detailed below. Blocks 20G, 21G, 22G and 24G summarize threshold functions to determine and/or implement measurement triggering based on the thresholds in accordance certain aspects of these teachings. In these regards the exemplary embodiments of this invention may be implemented at least in part by computer software stored on the MEM 20B, 21B, 22 and 24B which is executable by the DP 20A, 21A, 22A and 24A of the respective other devices 20, 21, 22 and 24 or by hardware, or by a combination of tangibly stored software and hardware (and tangibly stored firmware). Electronic devices implementing these aspects of the invention need not be the entire devices as depicted at FIG. 2, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 20B, 21B, 22 and 24B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 21A, 22A and 24A include but are not limited to general purpose computers, special purpose computers, microprocessors, digital signal processors (DSPs) and multi-core processors.

Mobility within the macro cell in CoMP scenario leads to UE leaving the coverage area of one of the LPN TPs and/or entering the coverage area of another LPN TP. As all the TPs (including the macro eNodeB) are sharing the same CRS ports, there will be a change in total received CRS RSRP at the UE. The received CRS RSRP will be the total combined CRS from all the TPs. Further, the received CRS RSRP will change as the UE is moving away from or closer to a macro eNodeB or an LPN TP. This change is illustrated in FIG. 3 which will be described in more detail below.

Figure 3:
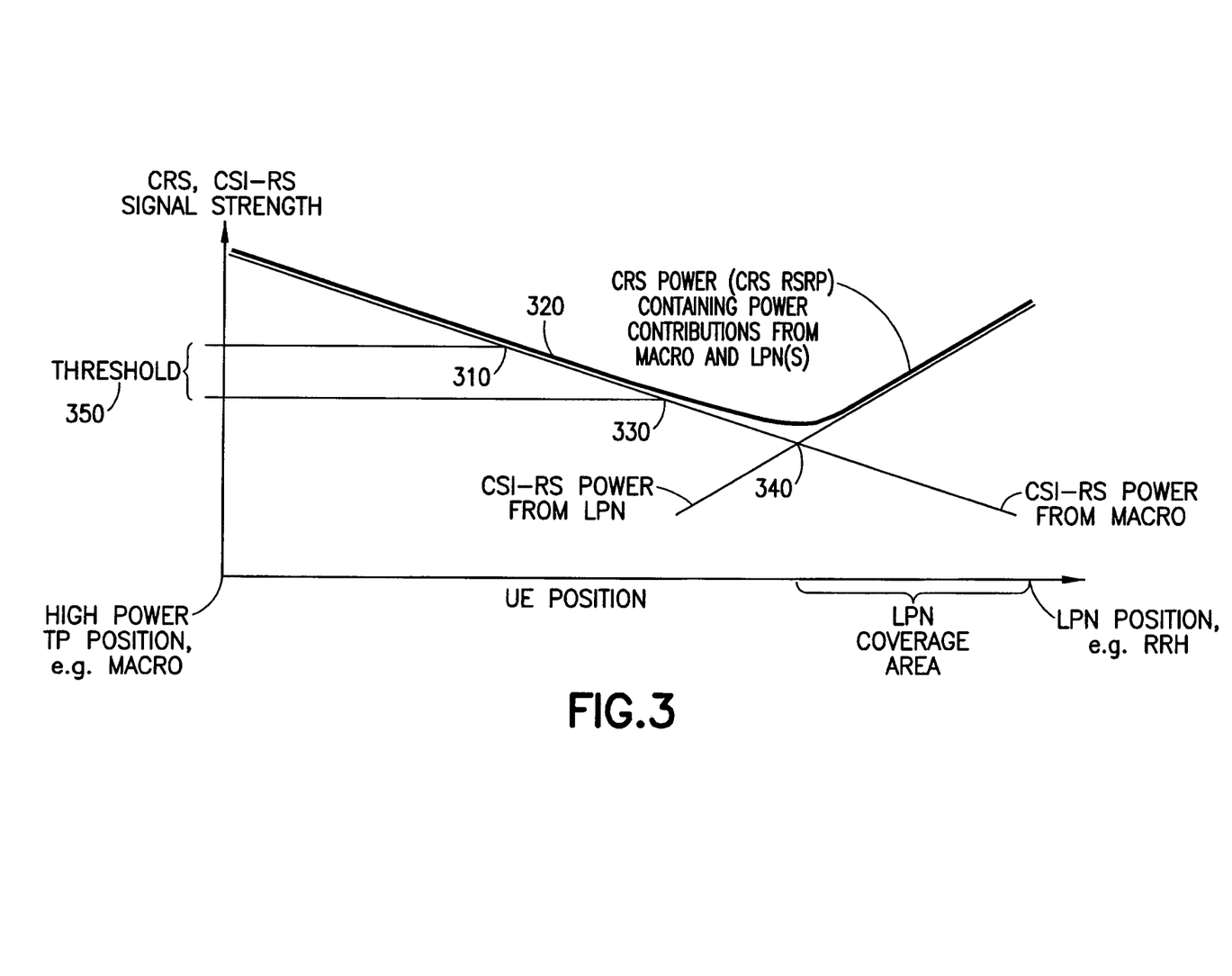
FIG. 3 shows a receiver power situation for intra-cell COMP in accordance with the exemplary embodiments of the invention.

FIG. 3 shows a CSI-RS measurement trigger in accordance with the exemplary embodiments of the invention. First, as stated above, the network transmits different CSI-RS resources from the different transmission points sharing the same cell-ID in the CoMP network. As shown at point 310 the UE is closest to one of the TPs or macro eNodeB, in this case the macro eNB. At point 310 the UE takes an initial set of measurements (CRS RSRP and CSI-RS RSRP). A measurement of the cell CRS received power (RSRP) reveals the combined received power of all the nodes sharing the same cell ID, the macro and the LPNs/TPs. The initial signal strength measurement on the CSI-RS resources of the CoMP Resource Management Set indicates the individual powers of the TPs and the macro. Further, as shown by point 320 of FIG. 3, as the position of the UE gets further away from the macro eNodeB the signal strength of the CRS RSRP overall as well as the CSI-RS RSRP of the macro eNB declines. As indicated above, continuous or repeated measurements of CRS RSRP are required for intra-cell mobility support. As a position of the UE changes the UE continues to monitoring the CRS RSRP. In accordance with the exemplary embodiments of the invention, at point 330 the UE could identify a first threshold level, absolute or relative, reached as the total CRS RSRP power declines or changes compared to the initial reference point of 310. The threshold is in the y-domain 310 indicates one starting point (where CRS & CSI-RS have been measured)—and 330 the point where the CRS RSRP has been changing more than the threshold. Further, as indicated in FIG. 3 the relative threshold 350 can have more than one threshold level. In accordance with the exemplary embodiments such a threshold being reached can trigger a new CSI-RS based signal quality measurement for all the CSI-RS resources of the CoMP Resource Management Set by the UE. In addition, in accordance with the embodiments the threshold or trigger can be based on an expected or potential measurement change, and/or a relative change, such as in comparison to another type of measurement and/or signal.

This triggering of new CSI-RS based signal quality measurement in UE can be alternatively using the combined information of the overall CRS RSRP power and/or information related to CSI-RS levels of high and/or low power TPs in a CoMP network, such as the CoMP network 1 of FIG. 2. In this case, the UE could as an example at a first threshold point 330 detect a CRS RSRP power change larger than the threshold 350 compared to the reference point 310 and first only trigger a new CSI-RS RSRP measurement at the threshold point 330 of the strongest transmission point or the strongest transmission points, which is in this example the CSI-RS of the macro. In case the change of CRS RSRP and CSI-RS RSRP of the strongest point or points was similar, there is no need to measure the CSI-RS RSRP of the remaining. In contrast, if the trigger occurs when moving instead from 330 to 340, the UE would see a larger change in CSI-RSRP from the previously strongest node (i.e., the macro) as compared to the CRS RSRP and would therefore be aware that the UE potentially has entered the coverage area of another node making new measurements of all the CSI-RS resources in the CoMP Resource Management Set necessary to be able to identify this node.

Alternatively, in accordance with another exemplary embodiment of the invention, if the user device observes or determines that the CRS RSRP has changed more than a given threshold the user device will trigger a new CSI-RS RSRP of all the CSI-RS resources. If the change in the CRS RSRP is below a given threshold this will not trigger new CSI-RS RSRP of all the CSI-RS resources but potentially only from the previously strongest.

In addition, in another alternative embodiment of the invention, it is also possible to trigger CSI-RS RSRP measurements of all the CSI-RS resources based on the determined difference between the measured CRS RSRP and the CSI-RS RSRP from the strongest node or nodes. Referring to FIG. 3 this would mean that at points 330 the difference between the measured CRS RSRP and CSI-RS RSRP is below a defined threshold and therefore the UE will not need to trigger CSI-RS RSRP of all the CSI-RS resources. At point 340 on the other hand the UE will observe a difference between the CRS RSRP and the CSI-RS RSRP of the strongest node(s) which exceed a defined threshold. Due to the difference exceeding the threshold this will trigger the UE to measure CSI-RS RSRP from all the CSI-RS resources in the CoMP Resource Management Set.

Further, in accordance with another exemplary embodiment of the invention, the user device can be configured to use the measurements at any time to determine that its position is not (or no longer) changing. In this case the user device may discontinue measurements, in accordance with the exemplary embodiments, until a change of position is again detected.

Figure 4:
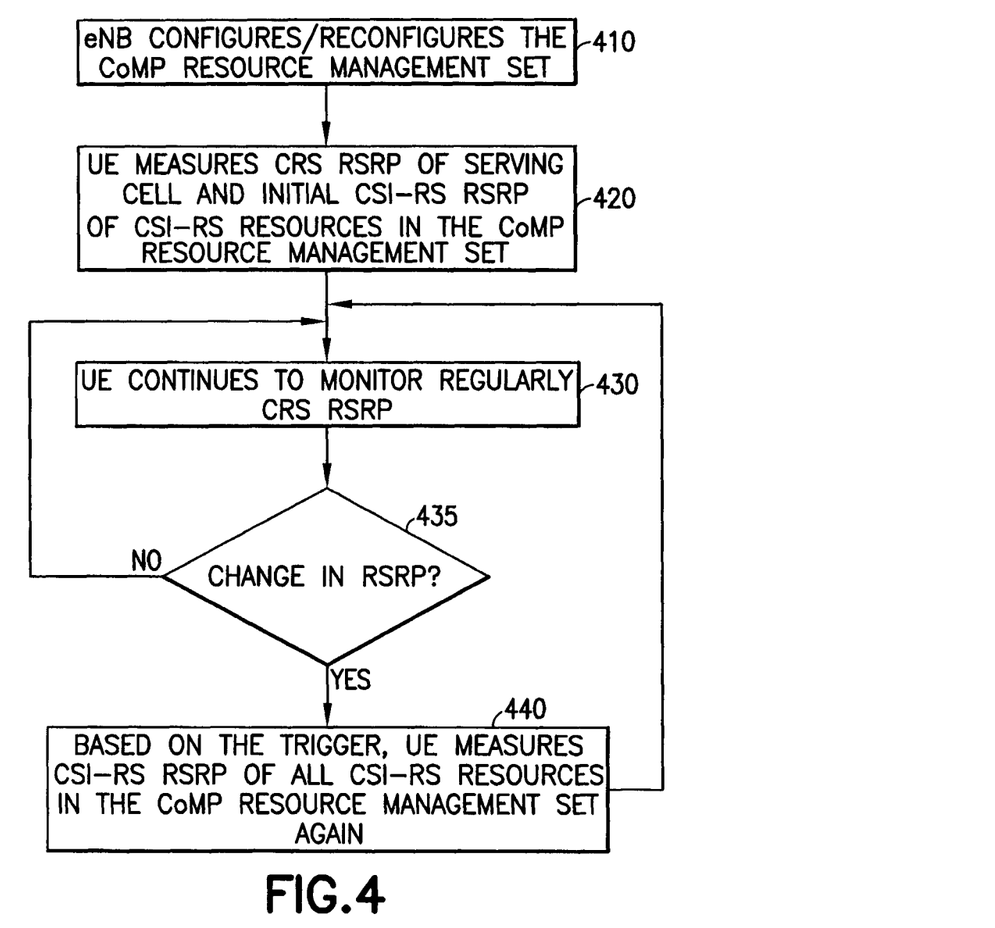
FIG. 4 illustrates a flow chart of a user equipment measurement procedure for a CoMP Resource Management Set in accordance with the exemplary embodiments of the invention.

FIG. 4 illustrates a flow chart of a measurement procedure for a CoMP Resource Management Set in accordance with an exemplary embodiment of the invention which may be performed by a network devices, such as the network devices 20, 21, and/or 22 and/or the user device 24 as illustrated in FIG. 2. At step 410 the eNodeB, such as the network device 20, 21, or 22, configures or reconfigures the CoMP Resource Management Set. Though not shown in FIG. 4, information regarding the CoMP Resource Management Set is sent to the UE, or the user device 24. At step 420 the UE, such as the user device 24, measures CRS RSRP and measures the CSI-RS resources as indicated by the information regarding the CoMP Resource Management Set of the CoMP network. At step 430 the UE continues to monitor regularly or at predefined intervals the CRS RSRP of the cell. At step 435 it is determined by the UE whether a change in CRS RSRP levels exceed a threshold. If the change does not meet or exceed the threshold the UE continues, as in step 440, to monitor the CRS RSRP. If the change at step 435 meets or exceeds the threshold then at step 440 a trigger causes the UE to again measure RSRP/RSRQ of the CSI-RS resources of the CoMP Resource Management Set. Further, in accordance with the exemplary embodiments of the invention the threshold can operate using combinations of these measurements, such that the threshold can identify increases and/or decreases one or more different measurements.

It is noted that, in accordance with an exemplary embodiment of the invention, the UE may determine not to continuously monitor the CSI-RS resources of the CoMP Resource Management Set. In accordance with still another exemplary embodiment of the invention the user device can continue monitoring the CRS based RSRP and if a change of CRS RSRP larger than a threshold is identified, a measurement of the all CSI-RS resources in the CoMP Resource Management Set can be triggered. In accordance with still another exemplary embodiment of the invention the user device can continue monitoring the CRS based RSRP and the CSI-RS based RSRP of the strongest points. If the relation is changing (e.g., change in CRS RSRP—but smaller/different change in CSI-RS RSRP of the strongest points), a measurement of the remaining CSI-RS resources in the CoMP Resource Management Set can be triggered. Rather, after the initial measurement, the CSI-RS resources of the CoMP Resource Management Set are only measured if a change in the CRS RSRP or relative change between CRS RSRP and CSI-RS RSRP of the strongest points meets or exceeds a threshold. In accordance with the exemplary embodiments the threshold can be determined by the UE and/or received from another device of the network. The threshold can comprise more than one threshold level and each level can be used to cause a different operation. The threshold level settings can be determined by the user device or received by the user device from the network. Such operations at each threshold level can include starting and/or stopping different ones or more of measurement operations at the user device.

Further, in accordance with the exemplary embodiments of the invention, the user device can use the CRS RSRP information combined with, for example, the macro eNB CSI-RS RSRP. As an example, based on a decline in the CSI-RS RSRP (possibly averaged over some time) of any network node, such as but not limited to the macro eNodeB, and an increase in CRS RSRP (also potentially averaged over time) the user device may conclude that it is in a coverage area of an LPN not yet measured. The user device may perform one or more CSI-RS RSRP measurements of all the CSI-RS resources.

Figure 5:
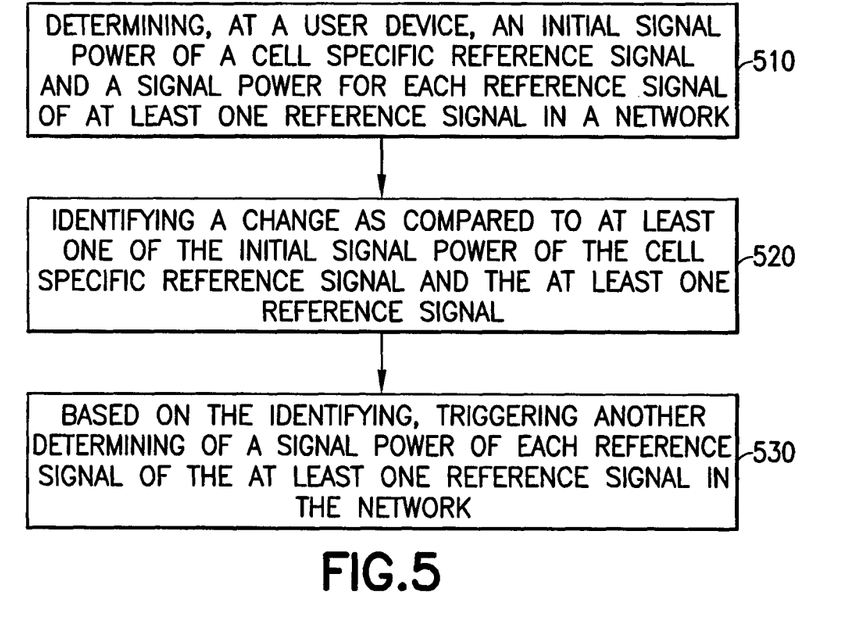
FIGS. 5 and 6 are logic flow diagrams that are illustrative of a method, and the operation of a computer program product in accordance with the exemplary embodiments of the invention.

In regards to FIG. 5 there is illustrated another method and the operation of a computer program product in accordance with an exemplary embodiment of the invention which may be performed by a network device, such as the user device 24 as illustrated in FIG. 2. As shown in step 510 of FIG. 5 there is determining, at a user device, an initial signal power of a cell specific reference signal and a signal power for each reference signal of at least one reference signal in a network. At step 520 there is identifying a change as compared to at least one of the initial signal power of the cell specific reference signal and the at least one reference signal. Then, based on the identifying as shown in step 530, there is triggering another determining of a signal power of each reference signal of the at least one reference signal in the network.

In accordance with the exemplary embodiments as described in the paragraph above, the identifying the change as compared to at least one of the initial signal power of the cell specific reference signal and/or the at least one reference signal is using a threshold.

In accordance with the exemplary embodiments as described in the paragraphs above, the network is a coordinated multipoint network.

In accordance with the exemplary embodiments as described in the paragraphs above, the identifying the change comprises identifying a change in a signal power of the at least one reference signal using another threshold.

In accordance with the exemplary embodiments as described in the paragraphs above, the threshold or the another threshold is one of determined by the user device or received by the user device from the network.

In accordance with the exemplary embodiments as described in the paragraphs above, the identifying the change in the signal power comprises identifying a change as compared to signal power of at least one of a strongest reference signal of the at least one reference signal.

In accordance with the exemplary embodiments as described in the paragraphs above, the identifying the change in the signal power comprises identifying a relative change as compared to the signal power of the at least one of the strongest reference signal and the initial signal power of the cell specific reference signal In accordance with the exemplary embodiments as described in the paragraphs above, the at least one reference signal is associated with at least one transmission point of the network.

In accordance with the exemplary embodiments as described in the paragraphs above, there is sending information regarding at least the signal power of the at least one reference signal to a source base station of the coordinated multipoint network.

In accordance with the exemplary embodiments as described in the paragraphs above, the network is a coordinated multipoint network.

In accordance with the exemplary embodiments as described in the paragraph above the at least one reference signal is a channel state information reference signal.

In accordance with the exemplary embodiments as described in the paragraph above the at least one reference signal is based on a coordinated multipoint network resource management set.

In accordance with the exemplary embodiments as described in the paragraphs above, there is, after the determining the initial signal power of the cell specific reference signal and the signal power for each reference signal of at least one reference signal, monitoring the signal power of the cell specific reference signal but not monitoring the each of the at least one reference signal.

In accordance with the exemplary embodiments as described in the paragraphs above, there is, after the determining the initial signal power of the cell specific reference signal and the signal power for each reference signal of the at least one reference signal, monitoring the signal power of the cell specific reference signal and at least one strongest reference signal power of the at least one reference signal.

In accordance with the exemplary embodiments as described in the paragraph above, there is determining there is a change in the at least one strongest reference signal power of the at least one reference signal, and based on the determining, again monitoring other reference signals of the at least one reference signal.

In accordance with the exemplary embodiments as described in the paragraphs above, the determining is in response to a request from the coordinated multipoint network to measure signal power of the at least one reference signal.

Further, in accordance with the exemplary embodiments of the invention there is means for determining, at a user device, an initial signal power of a cell specific reference signal and a signal power for each reference signal of at least one reference signal in a network; means for identifying a change as compared to at least one of the initial signal power of the cell specific reference signal and the at least one reference signal; and means, based on the identifying, for triggering another determining of a signal power of each reference signal of the at least one reference signals in the network.

In accordance with the exemplary embodiments as described in the paragraph above, the identifying the change in the signal power of at least one of the initial signal power of the cell specific reference signal and the at least one reference signal is using a threshold.

In accordance with the exemplary embodiments as described in the paragraphs above, the threshold is one of determined by the user device or received by the user device from the network.

In accordance with the exemplary embodiments as described in the paragraphs above, the network is a coordinated multipoint network.

In accordance with the exemplary embodiments as described in the paragraphs above, the identifying the change comprises identifying a change in a signal power of the at least one reference signal using another threshold.

In accordance with the exemplary embodiments as described in the paragraphs above, the threshold or the another threshold is one of determined by the user device or received by the user device from the network.

In accordance with the exemplary embodiments as described in the paragraphs above, identifying the change in the signal power comprises identifying a change as compared to signal power of more than at least one of a strongest reference signal of the at least one reference signal.

In accordance with the exemplary embodiments as described in the paragraphs above, there is means for sending information regarding at least the signal power of the at least one reference signal to a base station of the coordinated multipoint network.

In accordance with the exemplary embodiments as described in the paragraphs above, the at least one reference signals is associated with at least one transmission point of the network.

In accordance with the exemplary embodiments as described in the paragraphs above, the at least one reference signals is a channel state information reference signal.

In accordance with the exemplary embodiments as described in the paragraphs above, there is means for determining the initial signal power of the cell specific reference signal and the signal power for each reference signal of the at least one reference signal, and means for monitoring the signal power of the cell specific reference signal but not monitor the at least one reference signal.

In accordance with the exemplary embodiments as described in the paragraphs above, there is means, after the determining the initial signal power of the cell specific reference signal and the signal power for each reference signal of the at least one reference signal, for monitoring the signal power of the cell specific reference signal and at least one reference point with a strongest reference signal power of the at least one reference signal.

In accordance with the exemplary embodiments as described in the paragraphs above, there is means, based on determining there is a change in the strongest reference signal power of the at least one reference signal, for again monitoring other reference signals of the at least one reference signal.

In accordance with the exemplary embodiments as described in the paragraphs above, the determining is in response to a request from the network to measure signal power of the at least one reference signals.

In accordance with the exemplary embodiments as described in the paragraphs above, the means for determining, identifying, measuring, monitoring, and triggering comprises a computer readable memory embodying computer program code, the computer program code executed by at least one processor, and an interface to the network.

Figure 6:
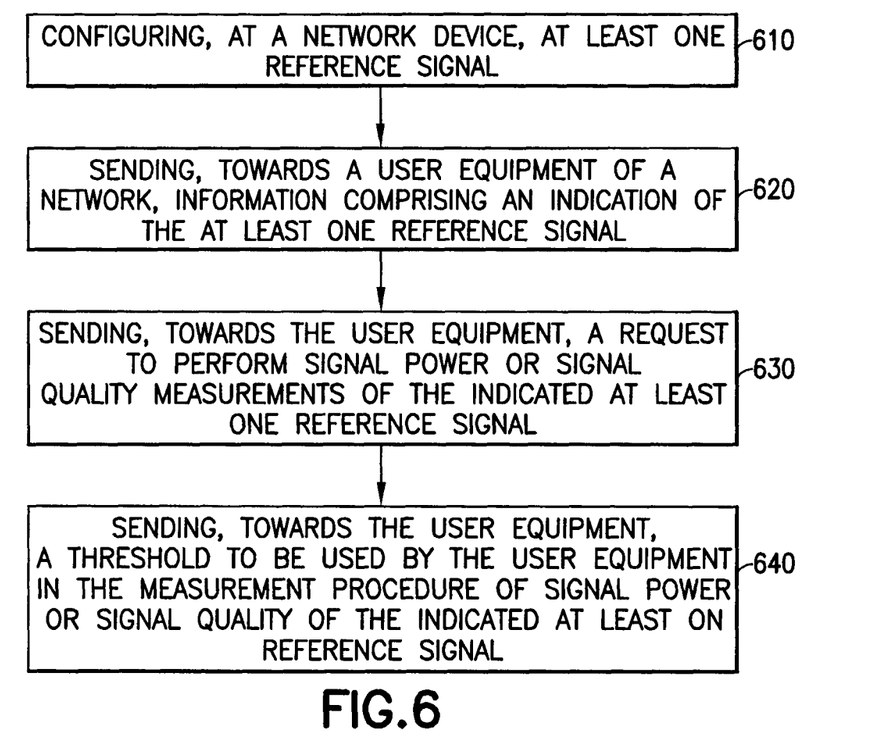

In regards to FIG. 6 there is illustrated another method and the operation of a computer program product in accordance with an exemplary embodiment of the invention which may be performed by a network node, such as a network device 20, 21, and/or 22 as illustrated in FIG. 2. As shown in step 610 of FIG. 6 there is configuring, at a network device, at least one reference signal. Then, as shown in step 620 there is sending, towards a user equipment of a network, information comprising an indication of the at least one reference signal. As shown in step 630 there is sending, towards the user equipment, a request to perform signal power or signal quality measurements of the indicated at least one reference signal; and as shown in step 640 there is sending, towards the user equipment, a threshold to be used by the user equipment in the measurement procedure of signal power or signal quality of the indicated at least on reference signal.

In accordance with the exemplary embodiments as described in the paragraph above there is sending at least one threshold setting towards the user equipment, wherein the threshold sets a relative level of comparison of signal power of the at least one reference signal and a cell specific reference signal for the user equipment measurement procedure.

In accordance with the exemplary embodiments as described in the paragraphs above, the network is a coordinated multipoint network.

In accordance with the exemplary embodiments as described in the paragraphs above, the at least one reference signal comprises at least one channel state information reference signal of the coordinated multipoint network.

In accordance with the exemplary embodiments as described in the paragraphs above, the at least one reference signal is associated with at least one transmission point of the coordinated multipoint network and where the at least one transmission point comprises at least one of a low power node and a high power node.

In accordance with the exemplary embodiments as described in the paragraphs above, there is receiving from the user device measurement information regarding the at least one reference signal and a cell specific reference signal.

In accordance with the exemplary embodiments as described in the paragraphs above, the measurement information comprises an indication of a change as compared to an initial signal power of the cell specific reference signal and the at least one reference signal.

In accordance with the exemplary embodiments as described in the paragraphs above, there is, based on the measurement information, re-configuring at least one reference signal of the network, and sending to the user equipment information comprising a request to measure the re-configured at least one reference signal of the network.

In accordance with the exemplary embodiments as described in the paragraphs above, the network device can comprise a base station.

Further, in accordance with the exemplary embodiments of the invention there is an apparatus comprising: means for configuring at least one reference signal; means for sending, towards a user equipment of a network, information comprising an indication of the at least one reference signal; means for sending, towards the user equipment, a request to perform signal power or signal quality measurements of the indicated at least one reference signal; and means for sending, towards the user equipment, a threshold to be used by the user equipment in the measurement procedure of signal power or signal quality of the indicated at least on reference signal.

In accordance with the exemplary embodiments as described in the paragraphs above, there is means for sending at least one threshold setting towards the user equipment, wherein the threshold sets a relative level of comparison of signal power of the at least one reference signal and a cell specific reference signal for the user equipment measurement procedure.

In accordance with the exemplary embodiments as described in the paragraphs above, the network is a coordinated multipoint network.

In accordance with the exemplary embodiments as described in the paragraphs above, the at least one reference signal comprises at least one channel state information reference signal of the coordinated multipoint network.

In accordance with the exemplary embodiments as described in the paragraphs above, the at least one reference signal is associated with at least one transmission point of the coordinated multipoint network and where the at least one transmission point comprises at least one of a low power node and a high power node.

In accordance with the exemplary embodiments as described in the paragraphs above, there is means for receiving from the user device measurement information regarding the at least one reference signal and a cell specific reference signal.

In accordance with the exemplary embodiments as described in the paragraphs above, the measurement information comprises an indication of a change as compared to an initial signal power of the cell specific reference signal and the at least one reference signal.

In accordance with the exemplary embodiments as described in the paragraphs above, there is means, based on the measurement information, for re-configuring at least one reference signal of the network, and means for sending to the user equipment information comprising a request to measure the re-configured at least one reference signal of the network.

In accordance with the exemplary embodiments as described in the paragraphs above, the means for configuring at least one reference signal; and means for sending, towards a user equipment of a network, information comprising an indication of the at least one reference signal.

In accordance with the exemplary embodiments as described in the paragraphs above, the threshold setting sets a relative level of comparison of signal power of the at least one reference signal and a cell specific reference signal for the user equipment measurement procedure.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   at least one processor; and
   at least one memory including computer program code, where the at least one memory and the computer program code are configured, with the at least one processor, to cause the apparatus to at least:
   measure, at the apparatus, a signal power of a cell specific reference signal for a cell having a plurality of transmission points in a network;
   based on the measuring, identify a change in the signal power of the cell specific reference signal; and
   based on the identified change in the signal power of the cell specific reference signal, trigger a measurement of a signal power of at least one other reference signal in the network,
   wherein the signal power of the cell specific reference signal for the cell comprises a signal power of a cell specific reference signal from a serving base station of the apparatus.

2. The apparatus according to claim 1, where the identifying the change in the signal power of the cell specific reference signal is using a threshold to trigger the measurement of the signal power of the at least one other reference signal in the network.

3. The apparatus according to claim 2, where the threshold comprises more than one threshold level, where each of the more than one threshold level is triggering starting or stopping of one or more different measurement operations at the apparatus for the cell.

4. The apparatus according to claim 3, where identifying the change in the signal power comprises at least one of identifying a relative change as compared to the signal power of the at least one of the strongest reference signal and an initial signal power of the cell specific reference signal or identifying a change as compared to signal power of at least one of a strongest reference signal of the at least one other reference signal.

5. The apparatus according to claim 1, where the network is a coordinated multipoint network.

6. The apparatus according to claim 5, where the at least one memory including the computer program code is configured with the at least one processor to cause the apparatus to send information regarding at least the signal power of the at least one other reference signal to a source base station of the coordinated multipoint network.

7. The apparatus according to claim 1, where the plurality of transmission points are using a same physical cell identifier.

8. The apparatus according to claim 1, where the at least one memory including the computer program code is configured with the at least one processor to cause the apparatus to, after the measuring the signal power of the cell specific reference, monitor the signal power of the cell specific reference signal but not monitor the at least one other reference signal.

9. The apparatus according to claim 1, where the at least one memory including the computer program code is configured with the at least one processor to cause the apparatus to:
   measure a signal power of the at least one other reference signal; and
   after the measuring the signal power of the cell specific reference signal and the signal power of the at least one other reference signal, monitor the signal power of the cell specific reference signal and at least one strongest reference signal power of the at least one other reference signal.

10. The apparatus according to claim 9, where the at least one memory including the computer program code is configured with the at least one processor to cause the apparatus to:
    determine there is a decrease in a reference signal power of the at least one strongest reference signal power of the at least one other reference signal; and
    based on the determining, again monitor other reference signals of the at least one reference signal.

11. An apparatus comprising:
    at least one processor; and at least one memory including computer program code, where the at least one memory and the computer program code are configured, with the at least one processor, to cause the apparatus to at least:
configure at least one reference signal;
send, towards a user equipment of a network, information comprising an indication of the at least one reference signal in a network;
send, towards the user equipment, a request to perform signal power or signal quality measurements of the indicated at least one reference signal; and
send, towards the user equipment, a threshold to be used by the user equipment in the signal power or signal quality measurements of the indicated at least one reference signal, wherein the threshold is used to identify a change in the signal power of the indicated at least one reference signal sufficient to cause the user equipment to trigger a measurement of a signal power of at least one other reference signal in the network,
wherein the signal power or signal quality measurements of the indicated at least one reference signal comprises a signal power or signal quality of a cell specific reference signal from a serving base station of the user equipment.

12. The apparatus according to claim 11, wherein the threshold setting sets a relative level of comparison of signal power of an initial power or the at least one reference signal and the changed signal power of the at least one reference signal.

13. The apparatus according to claim 11, where the network is a coordinated multipoint network.

14. The apparatus according to claim 13, where the at least one reference signal comprises at least one channel state information reference signal of the coordinated multipoint network.

15. The apparatus according to claim 13, where the at least one reference signal is associated with at least one transmission point of the coordinated multipoint network and where the at least one transmission point comprises at least one of a low power node and a high power node.

16. The apparatus according to claim 11, where the at least one memory including the computer program code is configured with the at least one processor to cause the apparatus to receive from the user equipment measurement information regarding the at least one reference signal and a cell specific reference signal.

17. The apparatus according to claim 16, where the measurement information comprises an indication of a change as compared to an initial signal power of the cell specific reference signal and the at least one reference signal.

18. The apparatus according to claim 17, where the at least one memory including the computer program code is configured with the at least one processor to cause the apparatus to:
based on the measurement information, re-configure at least one reference signal of the network; and
send to the user equipment information comprising a request to measure the re-configured at least one reference signal of the network.

19. A method comprising:
measuring, at a user device, a signal power of a cell specific reference signal for a cell having a plurality of transmission points in a network;
based on the measuring, identifying a change in the signal power of the cell specific reference signal; and
based on the identified change in the signal power of the cell specific reference signal, triggering a measurement of a signal power of at least one other reference signal in the network,
wherein the signal power of the cell specific reference signal for the cell comprises a signal power of a cell specific reference signal from a serving base station of the user equipment.

20. The method according to claim 19, where the identifying the change in the signal power of the cell specific reference signal is using a threshold to trigger the measurement of the signal power of the at least one other reference signal.

* * * * *

UNITED STATES PATENT AND TRADEMARK OFFICE
CERTIFICATE OF CORRECTION

PATENT NO. : 10,567,989 B2
APPLICATION NO. : 14/413633
DATED : February 18, 2020
INVENTOR(S) : Dalsgaard et al.

Page 1 of 1

It is certified that error appears in the above-identified patent and that said Letters Patent is hereby corrected as shown below:

In the Claims

Claim 12, Column 19, Line 26 "setting" should be deleted in between --threshold-- and --sets--.

Signed and Sealed this
Fifth Day of May, 2020

Andrei Iancu
*Director of the United States Patent and Trademark Office*